Jan. 2, 1968  R. E. SMITH  3,361,006
ACCELERATOR PEDAL
Filed March 14, 1966
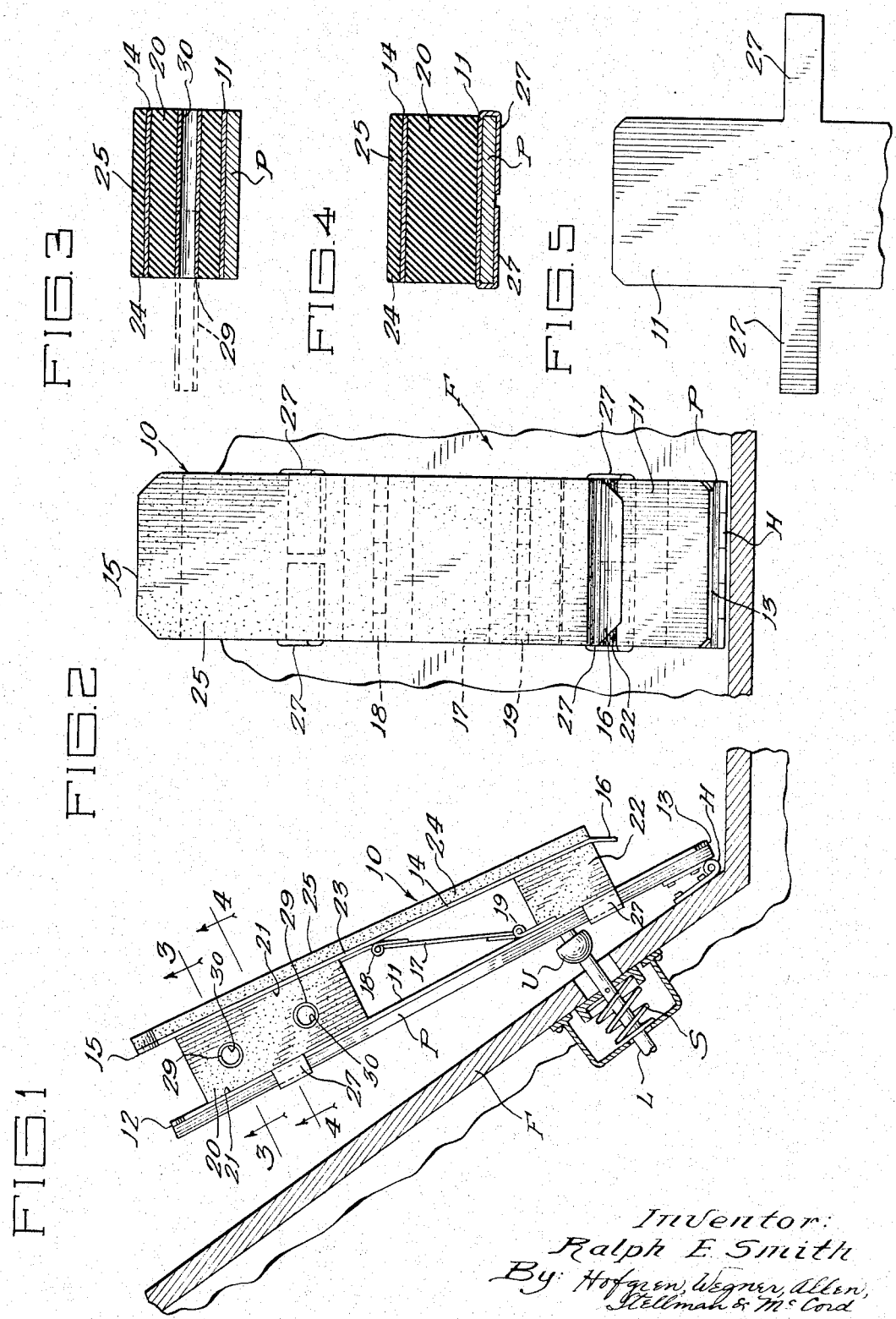
Inventor:
Ralph E. Smith
By Hofgren, Wegner, Allen,
Stellman & McCord
Attorneys

# United States Patent Office 3,361,006
Patented Jan. 2, 1968

3,361,006
ACCELERATOR PEDAL
Ralph E. Smith, 1307 Devon Ave.,
Park Ridge, Ill. 60068
Filed Mar. 14, 1966, Ser. No. 534,003
12 Claims. (Cl. 74—562)

ABSTRACT OF THE DISCLOSURE

A floating accelerator pedal structure which includes a lower rigid plate connected to operate the accelerator linkage system in a motor vehicle without substantial lost motion, an upper rigid plate, a hinge plate having one end hinged to the underside of the upper rigid plate and an opposite end hinged to the top of the lower rigid plate so that the upper plate "floats" on the lower plate within the permissible pivotal limits of the hinge plate. First resilient means of predetermined stiffness biases the lower plate and linkage toward an elevated position, while second resilient means biases the upper plate toward an elevated position and is of less stiffness than the first resilient means so as to cushion the application of compressive force to the first resilient means. Means are provided for varying the stiffness of the second resilient means.

Background of the invention

This invention relates to an improvement in accelerator pedals for motor vehicles which may either be incorporated into the accelerator pedal of a motor vehicle at the factory or may be in the form of an accessory for attachment to an accelerator pedal without modification of the pedal itself.

This invention is an improvement on the structure disclosed and claimed in my copending application Ser. No. 417,621, filed Dec. 11, 1964, issued Nov. 29, 1966, as Patent No. 3,287,992.

Summary of the invention

The primary purpose of this invention is to provide a unique "floating" accelerator pedal which permits a remarkably wide range of positions for the driver's foot to afford a more efficient and more comfortable operation of the motor vehicle. The device of this invention increases gasoline mileage, reduces foot and leg fatigue, increases the ease and pleasure of driving and improves the handling characteristics of a vehicle, especially on ice or snow.

It is another object of this invention to provide removable plastic tubes mounted in openings in the resilient blocks to vary the stiffness of the blocks in a series of steps.

The invention is illustrated in a preferred embodiment in the accompanying drawings, in which:

FIG. 1 is a side elevational view of the invention embodied in an accessory which is secured to a motor vehicle accelerator pedal;

FIG. 2 is a top plan view of the device of FIG. 1;

FIG. 3 is a sectional view taken generally along the line 3—3 of FIG. 1, illustrating one of the removable tubular members which permits adjustment of the resiliency of the device, the broken lines illustrating removal of said member;

FIG. 4 is a sectional view taken generally along the line 4—4 of FIG. 3; and

FIG. 5 is a top plan view of the front end of the lower rigid plate with the fastening means in the form of deformable projections extending outwardly before they are wrapped around the accelerator pedal.

Referring to the drawings in greater detail, and referring first to FIG. 1, a motor vehicle is provided with a floor board F, and an accelerator pedal P which is pivoted at its rear, or heel end, by means of a hinge H. Forward of the hinge is a universal joint connection U to a link L of an accelerator linkage by means of which movement of the pedal about the hinge H is transmitted to the carburetor. An accelerator spring assembly S urges the accelerator pedal upwardly toward idling position.

The preferred embodiment of the present invention, which is indicated generally by the reference numeral 10, is comprised of a lower rigid rectangular plate 11 having a front end 12 and a rear end 13; an upper rigid rectangular plate 14 that has a front end 15 and a rear end 16; nd a rigid hingle plate 17 having its front end hinged to the underside of the upper plate 14 at 18 and its rear end hinged to the top of the lower plate 11 at 19 so that the entire upper plate is capable of "floating" movement—i.e., translatory movement, pivotal movement about either hinge individually, or pivotal movement about both hinges simultaneously, within the permissible limits of the hinge plate 17 in relation to the lower plate 11.

The lower rigid plate 11 is preferably substantially the same length and breadth as the accelerator pedal P, so that the lower plate substantially overlies the accelerator pedal, while the upper rigid plate 14 is substantially the same breadth as the accelerator pedal but slightly shorter than the pedal at its rear end. When constructed as an accessory to be used for various sizes accelerator pedals of various model vehicles, the unit is made as wide as possible without interferring with a power brake pedal of a motor vehicle, many of which are placed very close to the accelerator pedal.

A resilient means is disposed between the lower and upper plates 11 and 14, respectively, for biasing the upper plate toward an elevated position. The resilient means includes a forward cushion block 20 of soft, resilient material secured to the lower plate and the upper plate, preferably by bonding with layers of adhesive 21. The forward block 20 is disposed between the hinge plate 17 and the front ends of the lower and upper plates 11 and 14, respectively. A rear cushion block 22 of soft, resilient material is similarly adhesively bonded between the lower plate 12 and upper plate 14, and is disposed between the rear end 19 of hinge plate 17 and the rear end 16 of the upper plate 14. The blocks 20 and 22 may be soft foam rubber, or a soft foam plastic, and preferably have their lower and upper surfaces diverging slightly toward the rear of the pedal to better conform to the normal inclination of the driver's shoe. A satisfactory material for blocks 20 and 22 is charcoal foam rubber.

Surmounting the upper plate 14, and bonded thereto by an adhesive layer 23, is a pedal pad 24 in the form of a strip or layer of soft, resilient material which may be foam rubber or foam plastic, with an impervious top skin 25 to prevent the foam rubber or foam plastic strip 24 from absorbing water that may be on the sole of the driver's shoe. A suitable material for the strip 24 is a commercially available closed cell foam which has the cells filled with an inert gas such as nitrogen. Alternatively, the pedal pad may be formed from material which is either waterproof or has a protective skin on all sides. The pedal pad may be omitted in certain embodiments, and the top surface of the upper rigid plate 14 may be roughened to provide a friction surface for the sole of the driver's shoe.

In order to secure the unit to the accelerator pedal P, a plurality of deformable projections or clamp members 27 (FIG. 5) are formed integrally with and extend outwardly away from the planar lower plate 11 and are wrapped around the accelerator pedal, as best illustrated in FIGS. 1 and 4, to secure the unit to the pedal. The lower plate 11 and projections 27 are preferably made of sheet metal or the like whereby the projections 27 can be securely clamped in an embracing manner about the pedal P, as best illustrated in FIG. 4.

The invention includes a means for adjusting the resiliency of the resilient means provided by the soft blocks 20 and 22, and is best illustrated in FIGS. 1 and 3 wherein a plurality of stiffening members 29, preferably in the form of stiffly resilient plastic tubes which are removably mounted in openings 30 in either of the resilient blocks 20 and 22 to vary the resilience in a series of steps. The drawings show openings and tubular members only in the forward block 20, but one or more openings may be provided in either or both of the resilient blocks to receive the tubular members 29. The tubular members, depending on their number and position, vary the amount of flexing and thus the resiliency of the foam rubber or foam plastic and thereby permit an adjustment of the stiffness of the floating pedal.

The resilient blocks 20 and 22 (with or without the tubular members 29) must be of less stiffness than the accelerator spring S, so the cushion blocks 20 and 22 and the spring S act in sequence. Initial foot movement is taken up by the cushion blocks and only after the cushion blocks have been compressed a predetermined amount does the accelerator spring S begin to compress and permit movement of the linkage L. The stiffness of the blocks 20 and 22 must also be such that the positioning of the driver's foot (afforded by the floating upper plate 14) is also in sequence. The stiffness of blocks 20 and 22, in order to render the floating action most efficient, must be sufficiently resilient to permit the most comfortable and most efficient position of the driver's foot to be arrived at before the blocks 20 and 22 are compressed to move linkage L (through spring S).

The "floating" movement of the upper plate 14, produced by the hinge plate 17, permits a remarkably wide range of positions for the driver's foot to afford a more comfortable and more efficient operation of the vehicle. The entire plate is capable of floating movement in relation to the lower plate 11 within the permissible pivotal limits of the hinge plate 17 and the expansion and contraction capabilities of the soft blocks 20 and 22.

It is perfectly clear that if the device is to be used as an improved accelerator pedal assembly in new motor vehicles, the accelerator pedal P can be eliminated, and the lower plate 11 substituted for it with a direct connection from the plate 11 to the hinge H and with the universal joint U to receive the accelerator link L fastened directly to the bottom of the lower plate 11.

The foregoing detailed description is given for clearness of understanding only and no unnecessary limitations should be understood therefrom, as modifications will be obvious to those skilled in the art.

I claim:

1. In an accelerator pedal for a motor vehicle having an accelerator linkage to the carburetor, in combination: a lower rigid plate hinged to a fixed part of the vehicle and having front and rear ends; means connecting said lower plate to the accelerator linkage so that movement of the plate about its hinge acts on the linkage without substantial lost motion; first resilient means of predetermined stiffness biasing said lower plate and linkage toward an elevated position; an upper rigid plate having front and rear ends; rigid means connected to the upper and lower plates to provide a floating mounting for the upper plate; a block of soft, resilient material beneath the upper plate biasing said upper plate toward an elevated position, said block of resilient material being of less stiffness than said first resilient means so that said block of resilient material compresses before the first resilient means when the pedal is depressed and thereby cushions the application of compressive force to the first resilient means; and a plurality of stiffening members within, and extending transversely of the block of soft, resilient material, said stiffening members being individually removable from said block.

2. The combination of claim 1 in which the stiffening members are stiffly resilient tubes.

3. In an accelerator pedal for a motor vehicle having an accelerator linkage to the carburetor, in combination: a lower rigid plate hinged to a fixed part of the vehicle and having front and rear ends; means connecting said lower plate to the accelerator linkage so that movement of the plate about its hinge acts on the linkage without substantial lost motion; first resilient means of predetermined stiffness biasing said lower plate and linkage toward an elevated position; an upper rigid plate having front and rear ends; rigid means connected to the upper and lower plates to provide a floating mounting for the upper plate, said rigid means being positioned intermediate the front and rear ends of said upper rigid plate; and second resilient means beneath the upper plate biasing said upper plate toward an elevated position, said second resilient means including a front resilient member forward of said rigid means and a rear resilient member behind said rigid means, said front and rear resilient members being of less stiffness than said first resilient means so that said second resilient means compresses before the first resilient means when the pedal is depressed and thereby cushions the application of compressive force to the first resilient means.

4. The combination of claim 3 in which each of said front and rear resilient members comprises a block of soft, resilient material.

5. In an accelerator pedal for a motor vehicle having an accelerator linkage to the carburetor, in combination: a lower rigid plate hinged to a fixed part of the vehicle and having front and rear ends; means connecting said lower plate to the accelerator linkage so that movement of the plate about its hinge acts on the linkage without substantial lost motion; first resilient means of predetermined stiffness biasing said lower plate and linkage toward an elevated position; an upper rigid plate having front and rear ends; a single hinge plate between said upper and lower plate providing a floating mounting for the upper plate, the hinge plate having its forward end hinged to the upper plate and its rear end hinged to the lower plate; and second resilient means beneath the upper plate biasing said upper plate toward an elevated position, said second resilient means being of less stiffness than said first resilient means so that said second resilient means compresses before the first resilient means when the pedal is depressed and thereby cushions the application of compressive force to the first resilient means.

6. The combination of claim 5 which includes means for adjusting the stiffness of said second resilient means.

7. An attachment for an automobile accelerator pedal comprising, in combination: a lower rigid plate having front and rear ends, said lower plate being substantially the same breadth as an accelerator pedal; an upper rigid plate having front and rear ends; rigid means connected to the upper and lower plates to provide a floating mounting for the upper plate, said rigid means being positioned intermediate the front and rear ends of said upper rigid plate; resilient means between the upper and lower plates and secured to one of said plates and biasing the upper plate toward an elevated position in relation to the lower plate, said resilient means including a front resilient member forward of said rigid means and a rear resilient member behind said rigid means.

8. The combination of claim 7 in which each of said front and rear resilient members comprises a block of soft, resilient material.

9. An attachment for an automobile accelerator pedal comprising, in combination: a lower rigid plate having front and rear ends, said lower plate being substantially the same breadth as an accelerator pedal; an upper rigid plate having front and rear ends; a single hinge plate between said upper and lower plates which has its forward end hinged to the upper plate and its rear end hinged to the lower plate; resilient means between the upper and lower plates and secured to one of the said plates and biasing the upper plate toward an elevated position in relation to the lower plate; and means securing said attachment to a motor vehicle accelerator pedal.

10. In an accelerator pedal for a motor vehicle having an accelerator linkage to the carburetor, in combination: a lower rigid plate hinged to a fixed part of the vehicle and having front and rear ends; means connecting said lower plate to the accelerator linkage so that movement of the plate about its hinge acts on the linkage without substantial lost motion; first resilient means of predetermined stiffness biasing said lower plate and linkage toward an elevated position; an upper rigid plate hinged to the lower rigid plate; second resilient means of less stiffness than said first resilient means secured to one of said plates and biasing the upper plate toward an elevated position, so that said second resilient means compresses before the first resilient means when the pedal is depressed and thereby cushions the application of compressive force to the first resilient means, and removable stiffening means secured to said second resilient means for varying the stiffness thereof.

11. The combination of claim 10 in which the second resilient means comprises a block of soft, resilient material, and the stiffening means comprises a plurality of stiffening members mounted within, and extending transversely of the block, said stiffening members being individually removable from said block.

12. The combination of claim 11 in which the stiffening members are stiffly resilient tubes.

References Cited
UNITED STATES PATENTS

| | | | |
|---|---|---|---|
| 2,628,507 | 2/1953 | Juergens | 74—562 |
| 3,287,992 | 11/1966 | Smith | 74—562 |

FRED C. MATTERN, Jr., *Primary Examiner.*